United States Patent [19]
Farleigh et al.

[11] Patent Number: 4,769,833
[45] Date of Patent: Sep. 6, 1988

[54] WIDEBAND SWITCHING SYSTEM

[75] Inventors: Scott E. Farleigh, Denver; John S. Helton, Lafayette; Allen L. Larson, Thornton; Frank C. Liu, Westminster, all of Colo.

[73] Assignees: American Telephone and Telegraph Company; AT&T Information Systems Inc., both of Holmdel, N.J.

[21] Appl. No.: 846,327

[22] Filed: Mar. 31, 1986

[51] Int. Cl.$^4$ .................. H04M 11/00; H04N 7/10
[52] U.S. Cl. ........................... 379/105; 358/86; 455/4
[58] Field of Search ............... 379/53, 54, 102, 105; 358/85, 86; 455/4, 5

[56] References Cited

U.S. PATENT DOCUMENTS

| | | | |
|---|---|---|---|
| 3,573,377 | 4/1971 | Anderson et al. | 379/54 |
| 3,612,767 | 10/1971 | Anderson et al. | 379/54 |
| 3,980,831 | 9/1976 | Mertel | 179/2 R |
| 4,381,522 | 4/1983 | Lambert | 358/86 |
| 4,402,008 | 8/1983 | Teraslinna | 358/86 |
| 4,475,187 | 10/1984 | Barabas | 358/86 X |
| 4,506,387 | 3/1985 | Walter | 358/86 X |
| 4,518,986 | 5/1985 | Yabiki et al. | 358/86 |
| 4,535,360 | 8/1985 | Briley et al. | 358/86 X |
| 4,538,174 | 8/1985 | Gargini et al. | 358/86 |
| 4,538,176 | 8/1985 | Nakajima et al. | 358/86 |
| 4,616,256 | 10/1986 | Boutmy | 358/86 |
| 4,654,866 | 3/1987 | Böttle et al. | 379/54 |

FOREIGN PATENT DOCUMENTS 2174874 11/1986 United Kingdom .................. 358/86

OTHER PUBLICATIONS

W. K. Ritchie "Multi-Service Cable-Television Distribution Systems", *British Telecommunications Engineering*, vol. 1, No. 4, Jan. 1983, pp. 205-210.

Kaneko et al., "NETEC-6/3 Video Transmission Equipment for Teleconference", Intelcon 79 Exposition Proceedings, pp. 579-582, Dallas, Tex., Feb. 26-Mar. 2, 1979.

Elmer H. Hara, "Conceptual Design of a Switched Television-Distribution System Using Optical-Fiber Waveguides", *IEEE Transactions on Cable Television*, vol. CATV-2, No. 3, Jul. 1977, pp. 120 to 130.

*Primary Examiner*—Keith E. George
*Attorney, Agent, or Firm*—James M. Graziano; John C. Moran

[57] ABSTRACT

The subject wideband switching network provides inexpensive point-to-point wideband communication connections. Wideband source and destination terminal equipment are either connected to modems which encode the analog signals used by the wideband source terminal equipment into digital signals for transmission through the wideband switching network and decode the received digital signals into analog signals used by the wideband destination terminal equipment; or are directly connected to the wideband switching network if source and destination terminal equipment transmit and receive digital signals. The modems are connected to the wideband switching network by optical fibers. The wideband switching network is a point-to-point space division switch that is comprised of a matrix of high frequency semiconductor crosspoints. Wideband communication connections are originated by a subscriber transmitting connection control signals to the wideband switching network controller on a dial-up basis from a telephone station set, on a data link from a computer or directly from a keyboard associated with the wideband switching network controller. The wideband switching network can concurrently switch any combination of voice, audio, video, data.

4 Claims, 5 Drawing Sheets

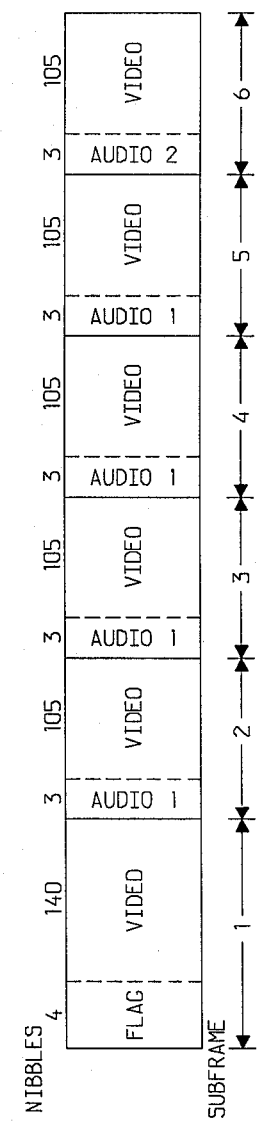
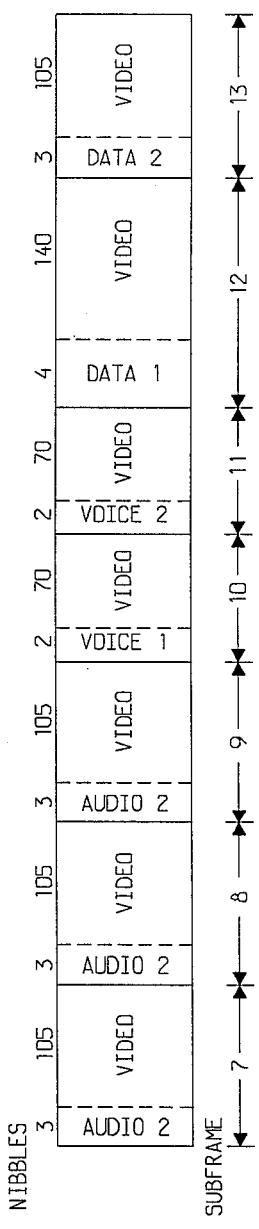
FIG. 5
PCM FRAME

WIDEBAND SWITCHING SYSTEM

TECHNICAL FIELD

This invention relates to communication systems and, in particular, to a wideband switching system that has the capacity to switch high frequency or wideband signals such as video or bulk data.

BACKGROUND OF THE INVENTION

Wideband signals are defined as high frequency or high bit rate signals such as video, bulk data or facsimile transmissions to differentiate this type of transmission from the low frequency or low bit rate signals such as standard data or voice transmissions. The earliest wideband switching systems were developed in conjunction with the Picturephone ® visual telephone service developed by AT&T. The Picturephone equipment was a collection of terminal devices which used analog baseband signals to transmit black and white television signals between the calling and the called parties to provide face-to-face, full motion video communications. The switching systems used to interconnect the Picturephone terminal equipment were space division analog switching systems. These switching systems had the capacity to switch only a limited bandwidth analog signal through the analog crosspoints and the terminal equipment served by these systems were limited to transmitting a baseband analog black and white television signal.

A number of other video terminal devices were developed subsequent to the introduction of Picturephone visual telephone service which devices attempted to conserve signal bandwidth by using slow scan or video signal compression techniques. These terminal devices were successful in conserving bandwidth but the quality of the signals transmitted by this equipment was unsatisfactory to customers. As a result of these limitations, the field of wideband switching was not commercially successful. There were a number of different switching systems and terminal equipment developed, but none achieved success in the market place.

Space division switching of analog signals in business communication systems was supplanted by time division switching of digital signals. These time division switching systems first digitally encode the analog transmissions from the terminal equipment served by these switching systems and then transmit the digitally encoded signals to a selected destination over a time multiplexed bus. Time division switching systems use a common time multiplexed bus to carry the digitally encoded signals between the terminal equipment and these time division busses have a limited bandwidth. A video signal requires significant bandwidth, especially if the transmission is of a color picture. The transmission capacity of a typical time division bus in a business communication system would quickly be occupied by a very few digitally encoded color television signals. Thus, it is impractical to use time division switching and the traditional business communication system architecture to transmit video signals.

An alternative to business communication systems for carrying video signals is the cable television or CATV type of system. These systems are typically coaxial cable based broadcast systems. The brandwidth capacity of a coaxial cable is significantly greater than a typical business communication system time division bus. The coaxial cable can concurrently carry a number of color TV transmissions. These transmissions are frequency multiplexed onto the coaxial cable and broadcast to all terminals served by the coaxial cable based system.

There are several difficulties associated with a CATV broadcast system. One of these is that the coaxial cable can only carry a certain finite number of transmissions. This number determines the size of the system, that is, how many concurrent transmissions can be broadcast and how many terminals can be served by the system. Another difficulty is that all the terminal equipment must be equipped with frequency shifting modems. The modems interconnect the terminal equipment with the coaxial cable transmission media. These modems must be able to shift frequencies under control of some control signal to translate the desired signal received on the coaxial cable from the frequency at which that signal is transmitted down to the frequency that is required for the terminal equipment. These frequency agile modems are expensive and the cost of such devices is proportional to the range of frequencies which these devices must span. Therefore, in a coaxial cable system that is capable of carrying a significant number of concurrent transmissions, these modems must be able to span a wide range of frequencies and are therefore very costly devices. Another limitation or disadvantage is that the coaxial cable system does not contain any capability for security. All receivers can access all transmissions carried by the coaxial cable.

SUMMARY OF THE INVENTION

The wideband switching system of the present invention overcomes these limitations by providing a technical advance in the form of a point-to-point wideband switching network. A particular embodiment is shown in the form of a business communication system that is equipped with an adjunct wideband switching network. The business communication system is a processor controlled time division switching system that serves a plurality of telephone station sets. The wideband switching network is a point-to-point space division switching system that is connected to the wideband source and destination terminal equipment. Control of the wideband switching network is provided to the subscribers of the business communication system on a dial-up basis by way of the telephone station sets or terminals which the subscribers use on the business communication system, or by a data link connection to a local area network which serves the subscribers' computer systems/terminals, or by way of a keyboard associated with the wideband switching network controller. As an example, the subscriber on the business communication system can use the telephone station set to dial a special access code to access a wideband service processor. The subscriber can then input control signals into this wideband service processor by way of the telephone station set to request a call connection from a first wideband terminal providing a source of wideband signals to the wideband receiver (such as video station equipment) associated with the subscriber's telephone station set. These control signals are carried by the business communication system from the subscriber's telephone station set to a wideband service processor which controls the operation of the wideband switching network. The wideband service processor responds to these control signals by establishing a wideband point-to-point connection from the wideband source terminal equipment identified by the subscriber to the wideband destination terminal equipment identified by the subscriber.

The wideband source and destination terminal equipment are connected to modems which typically encode the analog signals produced by the wideband source terminal equipment into digital signals for transmission through the wideband switching network and which decode the received digital signals into analog signals used by the receiving wideband destination terminal equipment. The modems are connected to the wideband switching network by optical fibers. The wideband switching network itself is a point-to-point space division switch that is comprised of a matrix of high frequency semiconductor crosspoints. The wideband service processor transmits signals over a data link to the wideband switching network to activate selected ones of these semiconductor crosspoints to directly connect a wideband source terminal equipment to the subscriber's wideband destination terminal equipment. These wideband switching network connections can carry any combination of voice, audio, video, data. The wideband terminal equipment served by this wideband switching system are video based (cameras, television monitors, tape players) or data based (computers, data links) or combinations thereof (frame creation systems, text processing systems, audio/visual teleconferencing facilities).

In this fashion, the exemplary embodiment illustrates how an existing business communication system can be used to provide a business customer with inexpensive point-to-point wideband communication services by connecting a wideband switching network through a wideband service processor to the business communication system.

Another application of this wideband switching system is in the stand alone mode where there is no business communication system interconnected with the wideband service processor. A subscriber accesses the wideband service processor by way of direct dial-up lines, a data link or a keyboard associated with the wideband service processor.

This wideband switching system overcomes the problems of prior video switching systems by providing a number of improvements: wideband point-to-point switching network architecture, wideband switching network digital crosspoints, optical fiber transmission links which connect the wideband sources and destinations to the wideband switching network, and inexpensive fixed frequency modems which concurrently convert a plurality of analog signals used by the source and destination terminal equipment to digital pulse code modulated signals for transmission through the optical fiber links to the switching network itself. These particular elements when combined as disclosed herein provide significant advantages over any known video switching system and enable wideband switching capability to be provided at an extremely low cost.

BRIEF DESCRIPTION OF THE DRAWINGS

FIG. 5 indicates the signaling format used in a single PCM frame.

DETAILED DESCRIPTION

Figure 1:
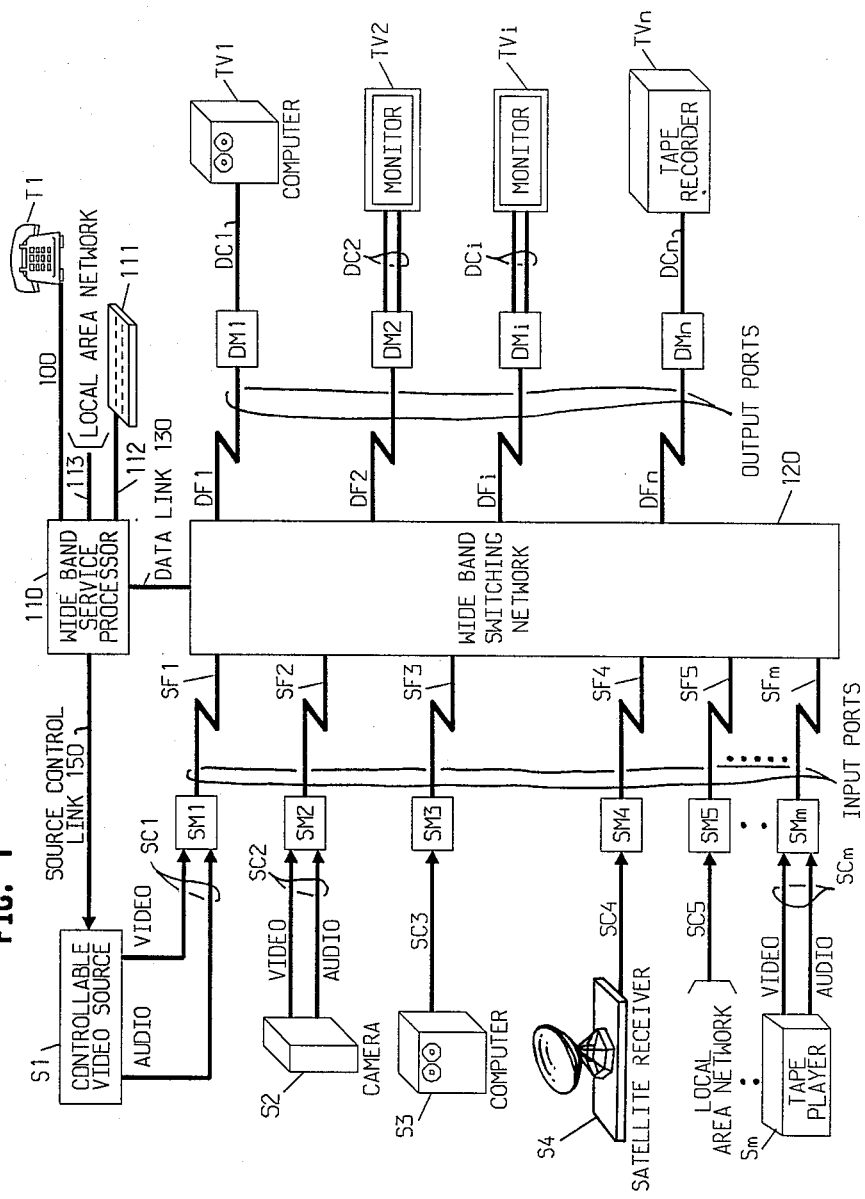
FIG. 1 illustrates the subject wideband switching system in block diagram form.

FIG. 1 illustrates in block diagram form one possible exemplary embodiment of a wideband switching system embodying the present invention. The central portion of the wideband switching system consists of a wideband switching network 120 which logically interconnects the signals from m wideband source devices (S1–Sm) with n wideband destination devices (TV1–TVn) as will be disclosed herein. The operation of wideband switching network 120 is controlled by wideband service processor 110. Wideband service processor 110 is connected by a number of service control channels to various sources of control signals. Service control channels can be a plurality of data links or channels on a multiplexed facility. Service control channels, for example, connect control signals transmitted by a subscriber served by a business communication system (shown as telephone T1) to wideband service processor 110 to control the operation of wideband switching network 120. Wideband service processor 110 is connected to wideband switching network 120 by a data link 130. Wideband service processor 110 can also be controlled by an operator at console 111 which is attached to wideband service processor 110 by leads 112 or by signals on input leads 113 which connect wideband service processor 110 to a local area network (not shown).

TERMINAL EQUIPMENT

Wideband switching network 120 serves a plurality of source and destination terminal devices. FIG. 1 illustrates a plurality of destination terminal devices (TV2–TVi) which, for the purpose of this discussion, can be considered to be color television terminals, each of which is associated with a particular subscriber's telephone station set. The signals input to each of these destination terminal devices (such as TV2) contain video, audio, voice and data components which are carried on conductors DC2. These signals are provided by an interface device (such as DM2) which consists of a video PCM decoder device illustrated in further detail in FIG. 4. The PCM decoder DM2 converts the digital signals received from wideband switching network 120 over optical fiber DF2 from the digital format of the optical fiber to the analog signals required to operate destination terminal device TV2. In addition, destination terminal device TVn illustrates an application where a tape recorder TVn is connected via leads DCn, modem DMn and optical fiber DFn to wideband switching network 120. Tape recorder TVn can receive and record signals from any of the source terminal equipment to which it is connected by wideband switching network 120.

A number of various source terminal devices are served on the input side of wideband switching network 120. A camera S2 is shown having video and audio analog signal output components which are applied over leads SC2 to a modem SM2. Modem SM2 is a video PCM coder which converts the analog video and audio signals output by camera S2 to PCM encoded digital signals which are carried by optical fiber SF2 to wideband switching network 120. In similar fashion, video tape players such as Sm can be connected through modem SMm to corresponding optical fiber SFm to wideband switching network 120. Satellite receiver S4 is yet another source of video signals which are applied via leads SC4 through modem SM4 to corresponding optical fiber SFm to wideband switching network 120.

Another type of device shown is controllable video source S1. A controllable video source is some apparatus which can provide a video and audio output as a result of control signals being applied thereto. Such a device can be a frame creation system or a digitally controlled tape player. Wideband service processor 110 is connected to controllable video source S1 by source control link 150. The control signals received by wideband service processor 110 from a subscriber are applied over source control link 150 to select a particular video information selection that the requesting subscriber wishes to receive from controllable video source S1. Controllable video source S1 responds to these control signals by transmitting the selected material in audio and video form over leads SC1 to modem SM1. Modem SM1 converts these analog signals to digital format and transmits same over optical fiber SF1 to wideband switching network 120.

In addition to the above-described video source and destination terminal equipment, computer equipment such as computers S3 and TV1 are connected to wideband switching network as is local area network S5. The modems SM3 and DM1 are simple devices in this application since the signals to and from computers S3 and TV1 as well as local area network S5 are already in digital form.

WIDEBAND SWITCHING ADJUNCT

To illustrate the operation of this system assume that a subscriber goes off hook on a telephone station set served by business communication system T1 and dials a special access code. Business communication system T1 responds to the dialed access code by connecting the subscriber through one of service control channels 140 to wideband service processor 110. The subscriber at the telephone station set then signals wideband service processor 110 by use of the tone signaling pad on the telephone station set to select a particular source of program material and, at the same time, identifies the destination to which the source material should be directed. Wideband service processor 110 responds to these control signals by causing the designated wideband source and destination terminal equipment to be connected together. This is accomplished by wideband service processor 110 transmitting control signals over data link 130 to wideband switching network 120 to activate the switching network crosspoints required to connect the designated source and destination. For example, tape player Sm can be connected to monitor TV2 by wideband switching network 120 activating the crosspoints required to connect the signal output by modem SMm on optical fiber SFm to the input of optical fiber DF2 which carries these signals to modem DM2 where these signals are converted back to analog video and audio material. These analog signals are carried by conductors DC2 to the input of destination terminal device TV2. Destination terminal device TV2 then displays program material output by the selected source, tape player Sm.

There are alternative methods of controlling the operation of wideband switching network 120. An operator at console 111 can input control signal via leads 112 to designate source and destination interconnections. In addition, a user can signal wideband service processor 110 from a computer connected to a local area network, which network is connected via leads 113 to wideband service processor 110.

WIDEBAND SWITCHING NETWORK

Figure 2:
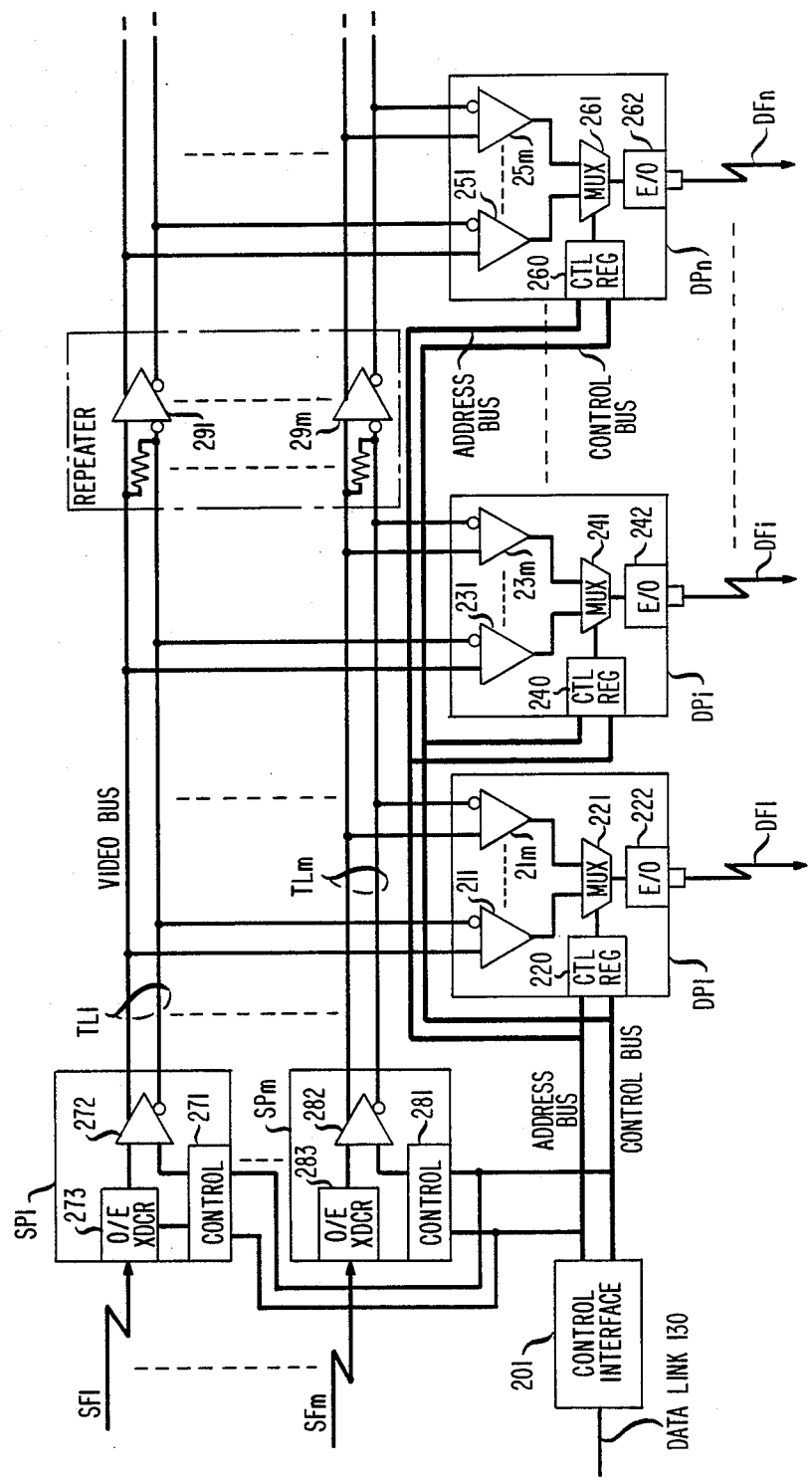
FIG. 2 illustrates the wideband switching network.

FIG. 2 illustrates in schematic diagram form the details of wideband switching network 120. The switch hardware is a centrally controlled m(48) in by n(390) out nonblocking switch matrix based on emitter coupled logic (ECL) interconnect circuitry. No link level synchronization is used in the switch matrix, so all switched channels can transparently handle Pulse Frequency Modulated (PFM) video signals or Pulse Code Modulated (PCM) data or video and data signals. Wideband switching network 120 contains a plurality of input port circuits (SP1-SPm) to interface the optical fiber data links serving the source terminal devices to the actual switch crosspoints. The output port circuits (DP1-DPn) serve to interface fiber optic data links (DF1-DFn) serving the destination terminal equipment with the switching network crosspoints.

Control of wideband switching network 120 is provided by wideband service processor 110, which consists of a personal computer, such as an AT&T PC 6300 computer. Wideband service processor 110 provides feature programming for wideband switching network 120, dial up remote control capability, administration and initialization functions and fault recovery. Control interface 201 is an 8086 processor based controller. Control interface 201 is connected to wideband service processor 110 by data link 130 which is a standard RS232 serial data link which operates at 9600 baud. Simple messages are passed between wideband service processor 110 and control interface 201 to establish and tear down video connections. Control of wideband switching network 120 is segmented into three areas: switch network control, operations control, and user interactive control.

SWITCH NETWORK CONTROL

A separate switch processor is located in control interface 201 and provides the low level switch driver functions. These functions include initialization of switch port control registers, writing the control registers to establish connections, clearing these registers for connection tear down, system configuration audits, and a message channel tear down, system configuration audits, and a message channel to wideband service processor 110.

OPERATIONS CONTROL

Wideband service processor 110 is a separate, high performance, microcomputer with a disk operating system. This processor provides higher level control functions needed to make the system reliable and easy to operate. These functions include an administrative data base, video program scheduling, switch usage recording, and disk backup of switch configurations for power failure recovery. Customized feature and applications programs are easy to install and run using high level programming languages and the MS/DOS operating system.

Wideband service processor 110 interfaces to control interface 201 via a RS-232 serial data link 130. This link will be used to pass commands and responses for connections to be established and removed, to schedule multiple connections, to load switch status during initialization and recovery, and to query the health of the switch.

USER INTERACTIVE CONTROL

In addition to the above functions, wideband service processor 110 contains hardware to implement a control center to which users gain access over dial up telephone lines 100, associated console 111, or a local area network connection 113. Users are for example able to dial wideband service processor 110 from a remote location, using a standard Touch-Tone analog telephone set located next to a video monitor, and enter video connection commands using the Touch-Tone pad of the telephone set in response to synthesized voice prompts received from wideband service processor 110. Control interface 201 interfaces the wideband service processor bus with an address and a control bus that is distributed throughout the wideband switching network to all of the input and output port circuits SP1–SPm and DP1–DPn.

PORT CIRCUITS

Wideband switching network 120 contains m video busses each of which is composed of a paired differential transmission line (TL1) driven by the complimentary outputs of an ECL bus driver (272) on an associated one of the source port circuits (SP1). Each of the source port circuits, for example SP1, contains six fiber optic data link receivers 273, control circuitry 271 and a bus driver 272. Wideband service processor 110 writes control information by way of control interface 201 and control bus into control register 271 to activate the bus driver 272.

The output port circuits DP1–DPn contain m+1 registers, illustrated on FIG. 2 as control registers 220. These m+1 registers are allocated one for each of m channel multiplexers 211–21m and one maintenance/ID register. The multiplexers 211–21m form the connection matrix of the wideband switching network. Each of the m channels consists of a single 48 to 1 multiplexer or selector and a control latch to determine which of the video busses is selected for transmission on the fiber link. Data stored in the control data latch 220 by control interface 201 are written by wideband service processor 110 using the control bus.

SIGNAL FORMAT

Digital communications have several advantages over analog communications: reliability of operation, miniaturization of circuitry, less calibration of equipment and more efficient multiplexing. Therefore, the wideband switching system of this invention converts the analog NTSC color television signal output by the video source devices into digital form for transmission from the wideband source terminal equipment to the destination wideband terminal equipment.

A PCM coder such as SM1 is used to perform this encoding function. This device is illustrated in schematic form in FIG. 3. The general function of PCM codes SM1 is to sample the analog NTSC color television signal output by the associated source, controllable video source S1, at three times the color subcarrier and format the sampled signal into eight bit samples. A video compression algorithm is used to reduce the channel output to four bits. The transmission rate of this digitized video signal is 42.95 Mbps, which is within the 45 Mbps transmission rate of DS3 type signaling. There obviously is additional frequency capacity remaining for audio data and voice communication signals. The audio signal output by the source is sampled at two times the video horizontal frequency and formatted into twelve bit samples. The transmission rate for this channel 314.6 Kbps. In addition, a standard 64 Kbps voice and asychronous data signal is multiplexed along with an additional audio channel to form the resultant data signal which is illustrated in FIG. 5. This resultant PCM frame is transmitted through the optical fiber data link SF1. In the decoder unit illustrated in schematic form in FIG. 4, this process is reversed and the video, audio, voice and data signals are separated from each other. The compressed video is reconstructed to NTSC color television format and applied along with the associated audio signal to the destination terminal equipment.

PCM CODER

Figure 3:
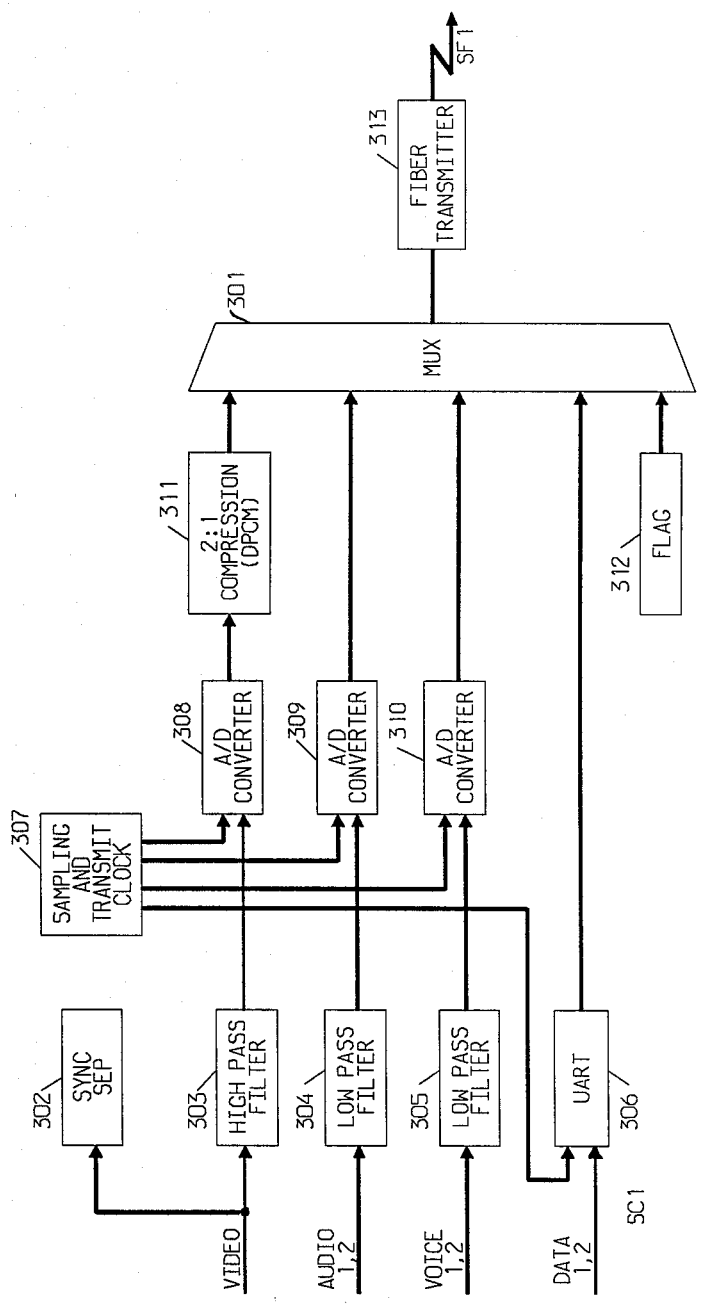
FIG. 3 illustrates one of the video PCM coder devices.

FIG. 3 discloses in schematic form the functional subsystems of video PCM coder SM1. A video signal applied by video source S1 is sampled by sync separator 302 to obtain synchronization pulses and the resulting sync signal is applied to sampling and transmit clock generator 307, which circuit generates the sampling and transmission clock signals required for the operation of video PCM coder SM1. A video signal is also applied to high pass filter 303 which permits only the analog video signal to be transmitted to A to D converter 308 which digitizes the received analog video signal. A video compression circuit 311 takes the digitized video signal and compresses the received eight bit samples into four bit video samples and applies the resulting signals to multiplexer 301. Concurrently, audio and voice signals are applied respectively to low pass filters 304 and 305 to permit signals of interest to be transmitted to the associated A to D converters 309, 310 respectively. Converters 309 and 310 digitize the received analog signals and apply these to multiplexer 301. Additionally, any data signals transmitted by source S1 are applied to multiplexer 301 through UART 306. Multiplexer 301 multiplexes the digitized video, audio, voice and data signals into a bit stream, the format of which is shown in FIG. 5. The output of multiplexer 301 is transmitted onto fiber optic data link SF1 by fiber transmitter 313.

Sampling and transmit clock circuit 307 generate clock signals necessary for each of the source A to D converters. As can be seen from FIG. 5, PCM frame consists of 1365 samples of the video channel, four samples each of the audio channels, one sample for each voice channel, 28 bits for V2 data channels and 16 bits of framing and flag information. In the frequency allocated for a video there are 1,365 samples for two video scan lines. First subframe shown in FIG. 5 consists of 16 bits of framing flag and 140 nibbles of video. Subframes 2–5 consist of three nibbles of audio channel 1 and 105 nibbles each of video. Subframes 6–9 each contain three nibbles of audio channel 2 and 105 nibbles each of video. Subframes 10–11 consist of one 8 bit voice sample and 70 nibbles of video. Subchannel 12 consists of 4 nibbles of data and 140 nibbles of video. The last subframe consists of 3 nibbles of data and 105 nibbles of video. Sampling clocks for the video, audio and voice A to D conversions as well as the clocks for data framing flag and fiber transmissions are all developed from the video horizontal sync pulses which are separated from the received analog video signal by sync separator 302.

PCM DECODER

Figure 4:
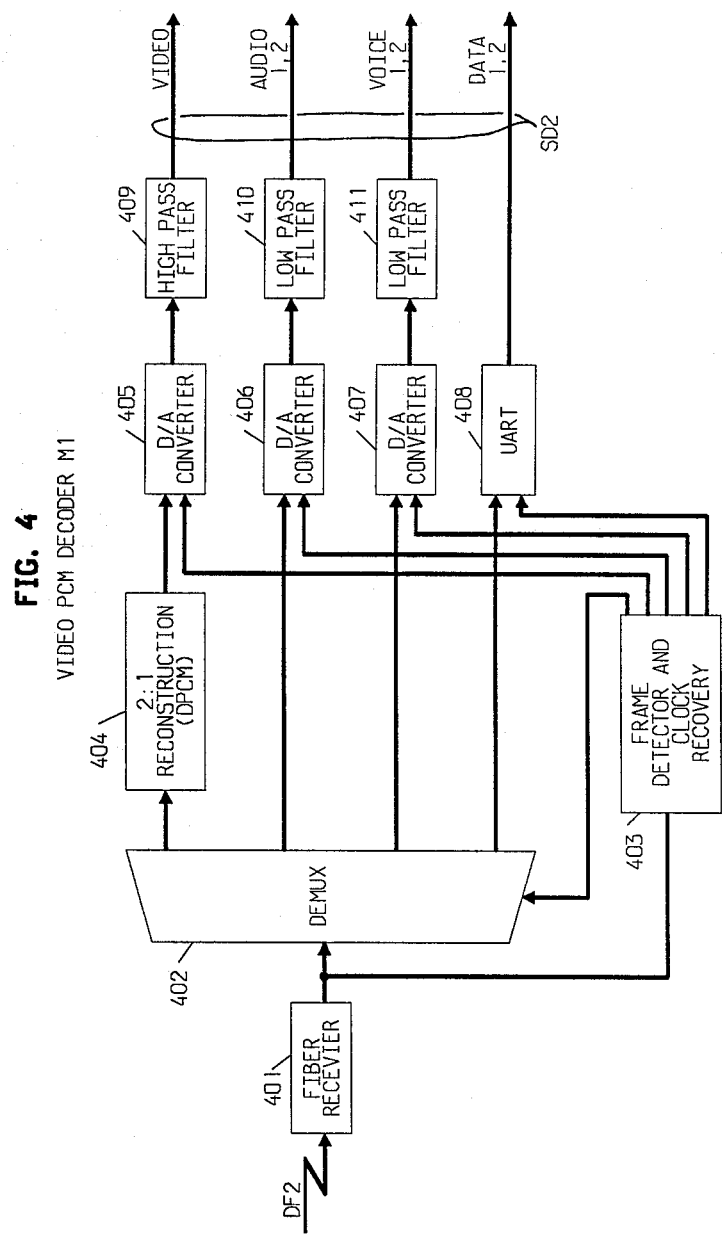
FIG. 4 illustrates one of the video PCM decoder circuits.

FIG. 4 discloses in schematic form the functional subsystems of video PCM decoder DM2. The PCM frame from fiber optic data link DF2 is received by fiber receiver 401 and passed to demultiplexer 402 and frame detector and clock recovery circuit 403. The clock signals necessary for D to A converters 405–407, UART 408 and demultiplexer 402 are all derived from the received PCM frame by frame detector and clock recovery circuit 403.

Demultiplexer 402 takes the received bit stream, the format of which is shown in FIG. 5, and separates the digitized video, audio, voice and data signals. Demultiplexer 402 applies the received data signals to the destination terminal equipment TV2 through UART 408. In similar fashion, demultiplexer 402 transmits the voice and audio signals to D to A converters 407, 406 respectively. D to A converters 406, 407 convert the received digitally encoded signals to analog signals and pass these analog signals to destination terminal equipment TV2 through low pass filters 410, 411 respectively. The digitally encoded video signals are transmitted by demultiplexer 402 to a video expansion circuit (2:1 reconstruction 404) where the received four bit video samples are expanded into eight bit samples of the original digitized video signal. These eight bit samples are converted into an analog video signal by D to A converter 405 which then passes the analog video signal to destination terminal equipment TV2 via high pass filter 409.

The above description illustrates one way point-to-point connections through wideband switching network 120 and it is obvious that any combination of the wideband terminal equipment can be co-located. Camera S2, monitor TV2, tape recorder TVn and tape player Sm can all be part of a video center served by wideband switching network 120. Similarly, computers S3 and TV1 can be served by both source and destination ports on wideband switching network 120 to obtain bidirectional communication capability.

While a specific embodiment of the invention has been disclosed, variations in structural detail, within the scope of the appended claims, are possible and are contemplated. There is no intention of limitation to what is contained in the abstract or the exact disclosure as herein presented. The above-described arrangement are only illustrative of the application of the principles of the invention. Normally, other arrangements may be devised by those skilled in the art without departing from the spirit and the scope of the invention.

What is claimed is:

1. A wideband switching system for interconnecting wideband terminal devices comprising:
business communication system connected to and serving a plurality of telephone station sets;
wideband switching adjunct connected to and serving a plurality of wideband sources and destination terminal devices wherein a set of said plurality of wideband sources are controllable wideband source devices;
wherein said business communication system includes:
means responsive to a subscriber at one of said telephone station sets dialing a wideband connect code identifying a desired wideband connection between an identified controllable wideband source device and an identified wideband destination device for generating a wideband communication connection control message;
means connected to and interconnecting said business communication system and said wideband switching adjunct for transmitting said wideband communication connection control message therebetween;
wherein said wideband switching adjunct includes:
a plurality of coder means connected on a one-to-one basis to each of said wideband source devices for converting the output of said source devices to digitally encoded signals;
a plurality of decoder means connected on a one-to-one basis to each of said wideband destination devices for converting said digitally encoded signals to signals for said wideband destination devices;
a plurality of fiber optic link means connected on a one-to-one basis to each of said coder means and said decoder means for carrying said digitally encoded signals;
means connected to said fiber optic link means in response to said wideband communication connection control message for directly connecting said digitally encoded signals from said coder means associated with said identified controllable wideband source device to said decoder means associated with said identified wideband destination device;
said connecting means comprises a wideband switching adjunct processor means for providing synthesized voice prompts to guide said subscriber in controlling said wideband switching adjunct and said identified controllable wideband source;
said generating means further responsive to said subscriber dialing a wideband select code identifying an operation to be performed by said identified controllable wideband source for generating a wideband communication selection control message;
said transmitting means responsive to said wideband communication selection control message for transmitting the latter message to said wideband switching adjunct;
said wideband switching adjunct processor means further responsive to said wideband communication selection control message for transferring said wideband communication selection control message to said identified controllable wideband source; and
said identified controllable wideband source responsive to the transferred wideband communication selection control message for performing the identified operation.

2. The system of claim 1 wherein said directly connecting means comprises a wideband space division switching network for establishing connections between fiber optic link means associated with said identified wideband source device and fiber optic link means associated with said identified wideband destination device.

3. The system of claim 2 wherein said wideband space division switching network comprises a matrix type switch whose crosspoints carry said wideband signals.

4. A method for interconnecting wideband sources and terminal devices using a wideband switching system having a business communication system connected to and serving a plurality of telephone station sets and a wideband switching adjunct connected to and serving a plurality of wideband sources and destination terminal devices and a set of said plurality of wideband sources are controllable wideband source devices, comprising the steps of:

identifying by said business communication system in response to a subscriber at one of said telephone station sets dialing a wideband connect code a desired wideband connection between an identified controllable wideband source device and an identified wideband destination device to generate a wideband communication connection control message specifying said desired connection;

interconnecting said business communication system and said wideband switching adjunct for transmitting said wideband communication connection control message therebetween;

converting the output of said source devices to digitally encoded signals by a plurality of coders in said wideband switching adjunct connected on a one-to-one basis to each of said wideband source devices;

converting said digitally encoded signals to signals for said wideband destination devices by a plurality of decoders in said wideband switching adjunct connected on a one-to-one basis to each of said wideband destination devices;

carrying said digitally encoded signals by a plurality of fiber optic links connected on a one-to-one basis to each of said coders and said decoders;

directly connecting by said wideband switching adjunct in response to said wideband communication connection control message said digitally encoded signals from said coder associated with said identified controllable wideband source device to said decoder associated with said identified wideband destination device;

providing synthesized voice prompts by said wideband switching adjunct to guide said subscriber in controlling said wideband switching adjunct and said identified controllable wideband source device;

said generating step further responsive to said subscriber dialing a wideband select code to identify an operation to be performed by said identified controllable wideband source to generate a wideband communication selection control message;

said transmitting step further responsive to said wideband communication selection control message to transmit the latter message to said wideband switching adjunct;

transferring said wideband communication selection control message to said controllable wideband source by said wideband switching adjunct further in response to said wideband communication selection control message; and performing the identified operation by said identified controllable wideband source in response to the transferred wideband communication selection control message.

* * * * *